(12) United States Patent
Schmidt et al.

(10) Patent No.: US 10,787,107 B2
(45) Date of Patent: Sep. 29, 2020

(54) TRANSPORT SYSTEM AND METHOD FOR OPERATING A TRANSPORT SYSTEM

(71) Applicant: SEW-EURODRIVE GMBH & CO. KG, Bruchsal (DE)

(72) Inventors: Josef Schmidt, Graben-Neudorf (DE); Maja Sliskovic, Ettlingen (DE); Michael Angst, Karlsruhe (DE); Gero Bockelmann, Bruchsal (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/063,598

(22) PCT Filed: Nov. 16, 2016

(86) PCT No.: PCT/EP2016/025147
§ 371 (c)(1),
(2) Date: Jun. 18, 2018

(87) PCT Pub. No.: WO2017/102092
PCT Pub. Date: Jun. 22, 2017

(65) Prior Publication Data
US 2019/0001857 A1    Jan. 3, 2019

(30) Foreign Application Priority Data

Dec. 18, 2015 (DE) .......................... 10 2015 016 396

(51) Int. Cl.
| | | |
|---|---|---|
| *G06F 17/00* | (2019.01) | |
| *B60P 1/02* | (2006.01) | |
| *B62D 12/02* | (2006.01) | |
| *G05D 1/02* | (2020.01) | |
| *B60P 3/40* | (2006.01) | |
| *B62D 61/10* | (2006.01) | |
| *B62D 63/02* | (2006.01) | |

(52) U.S. Cl.
CPC .................... *B60P 1/02* (2013.01);
*B60P 3/40* (2013.01); *B62D 12/02* (2013.01);
*B62D 61/10* (2013.01);
(Continued)

(58) Field of Classification Search
CPC ... B60P 1/02; B60P 3/40; B62D 12/02; B62D 61/10; B62D 63/02; G05D 1/0295; G05D 2201/0216
See application file for complete search history.

(56) References Cited

U.S. PATENT DOCUMENTS 3,591,195 A * 7/1971 Ilon ........................ B62D 61/10
280/81.1
9,709,977 B2 7/2017 Schulze et al.
(Continued)

FOREIGN PATENT DOCUMENTS

| DE | 102007046868 A1 | 4/2009 |
|---|---|---|
| DE | 102014016900 A1 | 5/2016 |
| WO | 2009040777 A2 | 4/2009 |

OTHER PUBLICATIONS

International Preliminary Report on Patentability issued in International Patent Application No. PCT/EP2016/025147, dated Jun. 19, 2018 (11 pages total).

(Continued)

*Primary Examiner* — Harry Y Oh
(74) *Attorney, Agent, or Firm* — Carter, DeLuca & Farrell LLP

(57) ABSTRACT

In a transport system and method for operating a transport system the transport system includes a first mobile component and a second mobile component as well as a transport rack. Bearing rollers for moving the transport rack on a driving surface are disposed on the transport rack, in particular, the mobile component is drivable on the driving surface. Each mobile component has a linear axle and a control as well as wheels driven by an electric motor. The first mobile component is able to drive underneath the transport rack in a first region of the transport rack, and the second mobile component is able to drive underneath the transport rack in another, i.e. second, region of the transport (Continued)

rack. The transport rack is able to be raised by extending the linear axles of the mobile components, in particular is able to be raised in such a way that the bearing rollers of the transport rack lose physical contact with the driving surface. A communications channel is provided between the first and the second mobile components, the communications channel serving as a transmission channel for data of at least one master-slave control, the first mobile component acting as a master and the second mobile component acting as a slave.

12 Claims, 4 Drawing Sheets

(52) U.S. Cl.
CPC ........... *B62D 63/02* (2013.01); *G05D 1/0295* (2013.01); *G05D 2201/0216* (2013.01)

(56) References Cited

U.S. PATENT DOCUMENTS

| | | | | |
|---|---|---|---|---|
| 2011/0133419 A1* | 6/2011 | Takehara | .............. | B62B 5/0086 280/79.3 |
| 2013/0015631 A1* | 1/2013 | Holland | ................... | B62D 1/00 280/98 |
| 2013/0236263 A1* | 9/2013 | Peterson | ................... | B60P 3/40 410/44 |
| 2013/0241432 A1* | 9/2013 | Ebihara | .............. | H05B 37/0272 315/224 |
| 2015/0110589 A1* | 4/2015 | Kim | .......................... | B66C 1/30 414/459 |
| 2015/0125252 A1* | 5/2015 | Berzen Ratzel | ....... | B62D 12/02 414/800 |
| 2015/0344086 A1* | 12/2015 | Scarth | ................... | B62D 63/08 280/411.1 |
| 2016/0236869 A1* | 8/2016 | Kimura | ................ | G05D 1/0291 |

OTHER PUBLICATIONS

International Search Report dated Mar. 3, 2017, in International Application No. PCT/EP2016/025147 (English-language translation).

Office Action issued in European Patent Application No. 16831485.4, dated Jun. 5, 2019.

Office Action issued in European Patent Application No. 16831485.4, dated Oct. 9, 2019.

* cited by examiner

TRANSPORT SYSTEM AND METHOD FOR OPERATING A TRANSPORT SYSTEM

FIELD OF THE INVENTION

The present invention relates to a transport system and to a method for operating a transport system.

BACKGROUND INFORMATION

German Published Patent Application No. 10 2014 010 915 discloses a conveyor system having a movable part on which bus segments are lined up next to each other, each having a master and slaves in a linear topology; the master of the respective adjacent bus segment is also a participant in the other bus segment. A contact-free data transmission exists between the stationary part and the masters.

A conveyor system for conveying objects, as well as a control method for this system, are described in German Published Patent Application No. 10 2014 016 900.

German Published Patent Application No. 10 2007 046 868 describes a transport device for load carriers and a method for its control.

SUMMARY

Example embodiments of the present invention provides an effective intralogistic transport that particularly allows for the transport of oversized containers.

According to an example embodiment of the present invention, a transport system includes a first mobile component and a second mobile component as well as a transport rack. Bearing rollers for moving the transport rack on a driving surface are disposed on the transport rack, and the mobile component is movable on the driving surface, in particular. Each mobile component has a linear axle and a control as well as wheels that are driven by an electric motor. The first mobile component is capable of driving underneath the transport rack in a first region of the transport rack, and the second mobile component is capable of driving underneath the transport rack in another, i.e. a second, region of the transport rack. The transport rack is able to be raised by extending the linear axles of the mobile components, in particular is able to be raised such that the bearing rollers of the transport rack lose physical contact with the driving surface. A communications channel is provided between the first and the second mobile component, and the communications channel functions as a transmission channel for data of at least one master-slave control, the first mobile component functioning as a master and the second mobile component functioning as a slave.

This has the advantage that joint driving is able to be carried out in a plant, or in other words, that a transport rack is transportable that would not be transportable when using a single mobile component. To do so, the transport rack may be longer than the mobile component, particularly more than twice as long as the mobile component, especially measured in the driving direction. The communications channel is able to be positioned in a protected manner underneath the transport rack. In addition, the mobile components are controllable in a master-slave control. The movements of the mobile component that acts as a slave are therefore able to be executed as a function of the mobile component that acts as the master. The mobile components may also be operated separately and individually, i.e. independently of each other, if no joint driving is to be carried out. However, the mobile components are then only capable of transporting small loads or no loads at all.

The transport rack is able to be shifted by hand using the bearing rollers, i.e. without a motoric drive of the mobile components.

The first mobile component may monitor the distance to the second mobile component, and/or the second mobile component may monitor the distance to the first mobile component. This is considered advantageous as it ensures additional, greater safety.

The communications channel may have modulated light, in particular infrared light or visible light, and/or may be situated between the transport rack and the driving surface. This offers the advantage that the communications channel is located in a protected environment. Even an optical or infrared-optical transmission of information is therefore able to be carried out.

The master-slave control may be used to control and/or operate the travel drive of the mobile component that is acting as a slave, as a function of instantaneously determined values of a physical quantity of the travel drive of the mobile component acting as a master, in particular such that the distance between the two mobile components is constant and/or such that the transport rack is disposed on the mobile component in a relatively immobile manner. This offers the advantage that the coordination of the movements of the mobile components takes place in such a precise manner that the transport rack will not shift relative to the mobile components. As a result, joint driving, i.e. a movement of the transport rack with the aid of two mobile components, is able to be carried out.

The linear axle of the mobile component acting as a slave may be controlled and/or operated by the master-slave control as a function of instantaneously determined values of a physical quantity of the linear axle of the mobile component acting as a master, in particular such that the transport rack is evenly raised by the two linear axles. This has the advantage that the transport goods will not be tilted, which means that even fluids in a container which is open on the top are transportable.

The communications channel may function as a transmission channel for data of a first and a second master-slave control, the first mobile component functioning as the master and the second mobile component functioning as the slave in each case. The two controls may be operated in a manner that overlaps in time. The first master-slave control in particular may control and/or operate the travel drive of the mobile component that acts as the slave as a function of instantaneously determined values of a physical quantity of the travel drive of the mobile component that acts as the master, in particular such that the distance between the two mobile components is constant and/or the transport rack on the mobile components is disposed in a relatively immobile manner. The second master-slave control in particular may control and/or operate the linear axle of the mobile component acting as the slave as a function of instantaneously determined values of a physical quantity of the linear axle of the mobile component acting as the master, in particular such that the transport rack is evenly raised by the two linear axles. This has the advantage that joint driving is able to be carried out, and the data that must be transmitted in order to carry out the control are transmitted via the communications channel in the same time segment as the data that must be transmitted in order to execute the control of the linear axles. In other words, the lifting axles are thereby already extendable towards the respective receiving area of the transport rack even when the mobile components have not yet been completely driven underneath the transport rack.

The wheels of one or of both mobile components may be steerable, in particular, the wheel fixture unit, especially the turntable, being rotatably disposed on the respective rack of the mobile component, the axis of rotation being parallel to the normal direction of the driving surface at the point where the wheels are in contact with the driving surface. This offers the advantage that the steering is able to be carried out in that two wheels that are accommodated in the wheel fixture unit and are aligned in parallel are operated at different rotational speeds, so that the wheel fixture unit is rotated relative to the rack of the respective mobile component. The axis of rotation of the wheel fixture unit is aligned at a right angle to the wheel axles, especially parallel to the normal direction, in relation to the driving surface, of the tangential plane touching at the point of contact between the wheels and the driving surface.

The communications channel may be situated between the mobile components and underneath the transport rack, in particular between the driving surface and the transport rack. This has the advantage of allowing the communications channel to be arranged as an optical light transmission channel.

According to an example embodiment of the present invention, in a method for operating a transport system, a position is detected in at least one of the mobile components and transmitted to the other mobile component.

This offers the advantage that a position-related control is able to be carried out. Here, the actual position of the first mobile component determined by the first mobile component, especially together with the determined orientation of the first mobile component in the plant, is transmittable to the second mobile component, and the setpoint values for the orientation and position of the second mobile component, to which the mobile component is able to be controlled, may be calculated therefrom.

One of the mobile components may function as the master and the other as the slave, the mobile component functioning as the master determines its intended driving diagram to the mobile component functioning as the slave, the mobile component functioning as the slave determines its own driving diagram therefrom, and the driving diagram especially includes the time characteristic of the velocities determined for driving the trajectory provided for the mobile component functioning as the master. This has the advantage of allowing for an uncomplicated execution of the joint driving.

The currently required torque may be determined in the mobile component functioning as the master, and a first share of this torque may be used as the setpoint value for a torque control located in the mobile component functioning as the master, so that the torque that is generated by the drive of the mobile component functioning as the master is controlled to this setpoint value. The remaining share of the torque determined as instantaneously required may be used as a setpoint value for a torque control that is located in the mobile component acting as the slave, so that the torque generated by the drive of the mobile component acting as the slave is controlled to this setpoint value. This has the advantage that a torque control that forms the basis of the position control or the velocity control is able to be carried out.

In a method for operating a transport system, one of the mobile components acts as the master and the other acts as the slave, and the instantaneously required torque is determined in the mobile component acting as the master in each case. A first share of this torque is used as the setpoint value for a torque control that is located in the mobile component acting as the master so that the torque generated by the drive of the mobile component acting as the master is controlled to this setpoint value, and the remaining share of the torque instantaneously determined as required is used as a setpoint value for a torque control that is located in the mobile component acting as the slave so that the torque generated by the drive of the mobile component acting as the slave is controlled to this setpoint value.

This has the advantage of allowing for joint driving in a force-controlled manner. As a result, the relative position of the transport rack with respect to the mobile component remains unchanged for as long as the absolute amounts of the drive forces directed tangentially to the driving surface are smaller than the stiction force of the transport rack at its surface that is in contact with the linear axles of the mobile components. The force generated by pure stiction is capable of being increased by a form-locked connection, such as depressions on the transport rack with which projections of the linear axles engage.

The instantaneously required torque results from the driving diagram. For example, if a velocity is to be increased within a certain period of time, this requires an acceleration along the driving route that corresponds to a torque of the drive.

Further features and aspects of example embodiments of the present invention are described in greater detail below with reference to the appended Figures.

DETAILED DESCRIPTION

Figure 1:
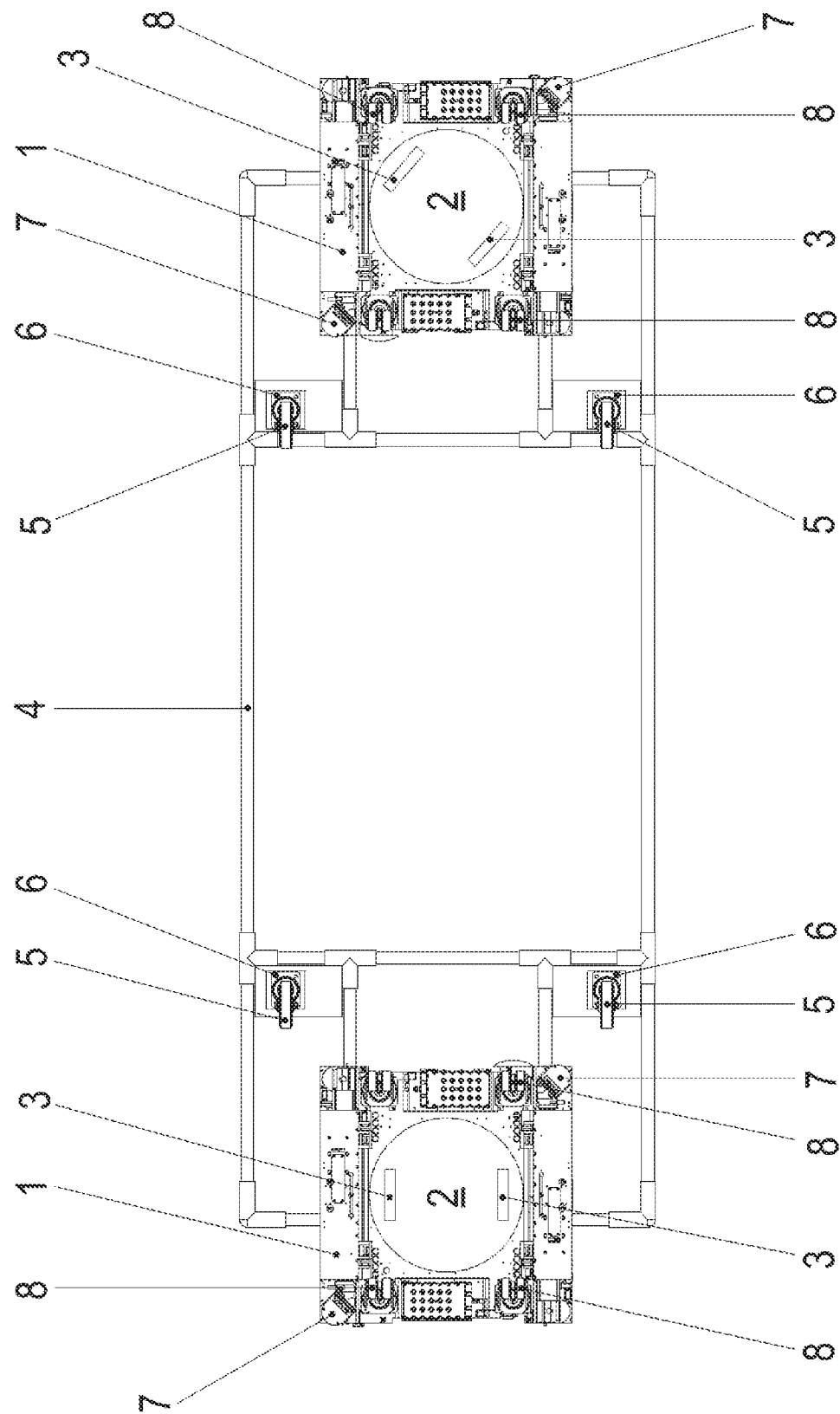
FIG. 1 shows a transport system according to an example embodiment of the present invention in a view from below, the transport system of two mobile components 1 and a transport rack 4 on which roller bearing units 6 having rollers 5 are fixed in place.
Figure 2:
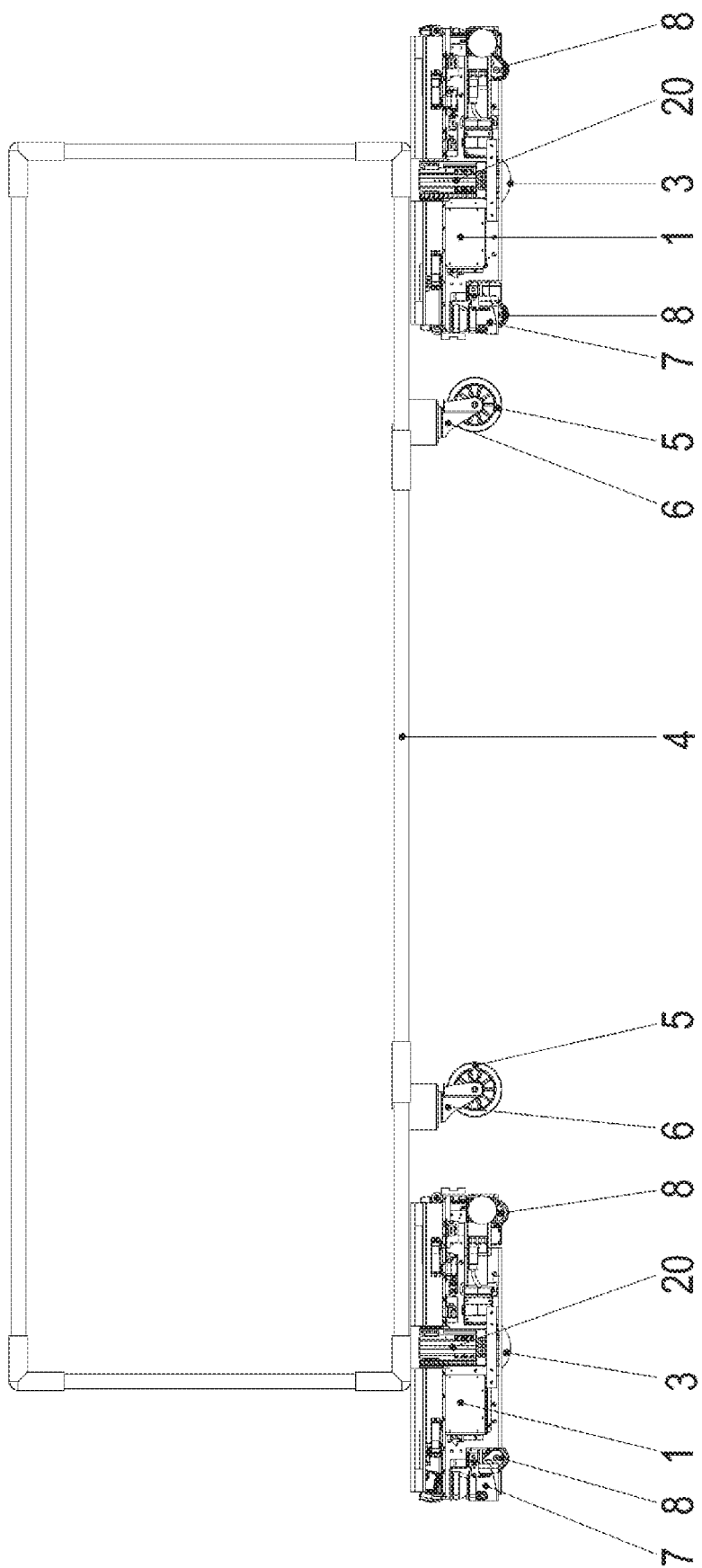
FIG. 2 shows an associated side view.
Figure 3:
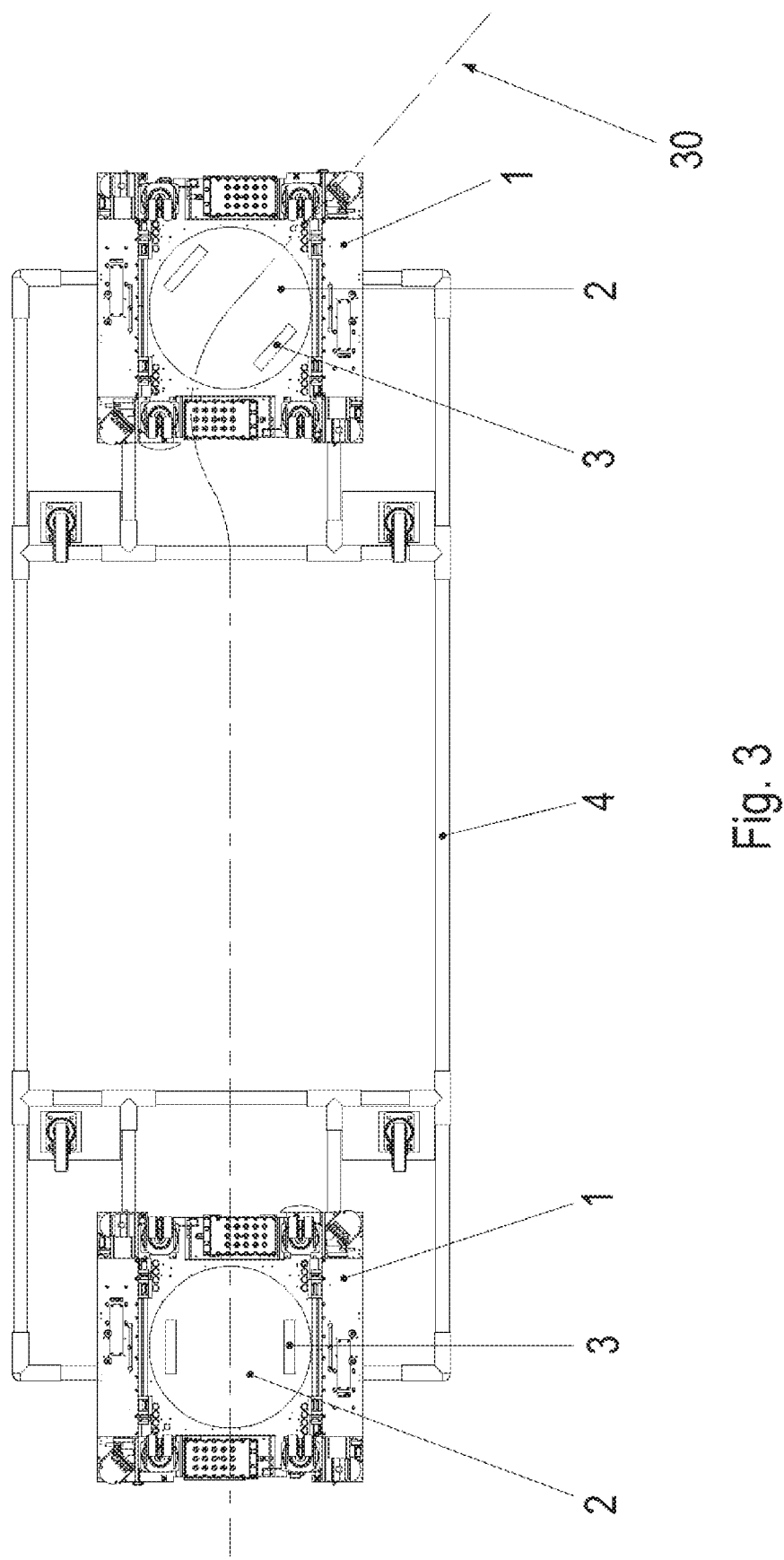
FIG. 3 shows a trajectory 30 along which travel may take place if first mobile component 1 has steerable drive wheels and second mobile component 1 has drive wheels that have a specified orientation.
Figure 4:
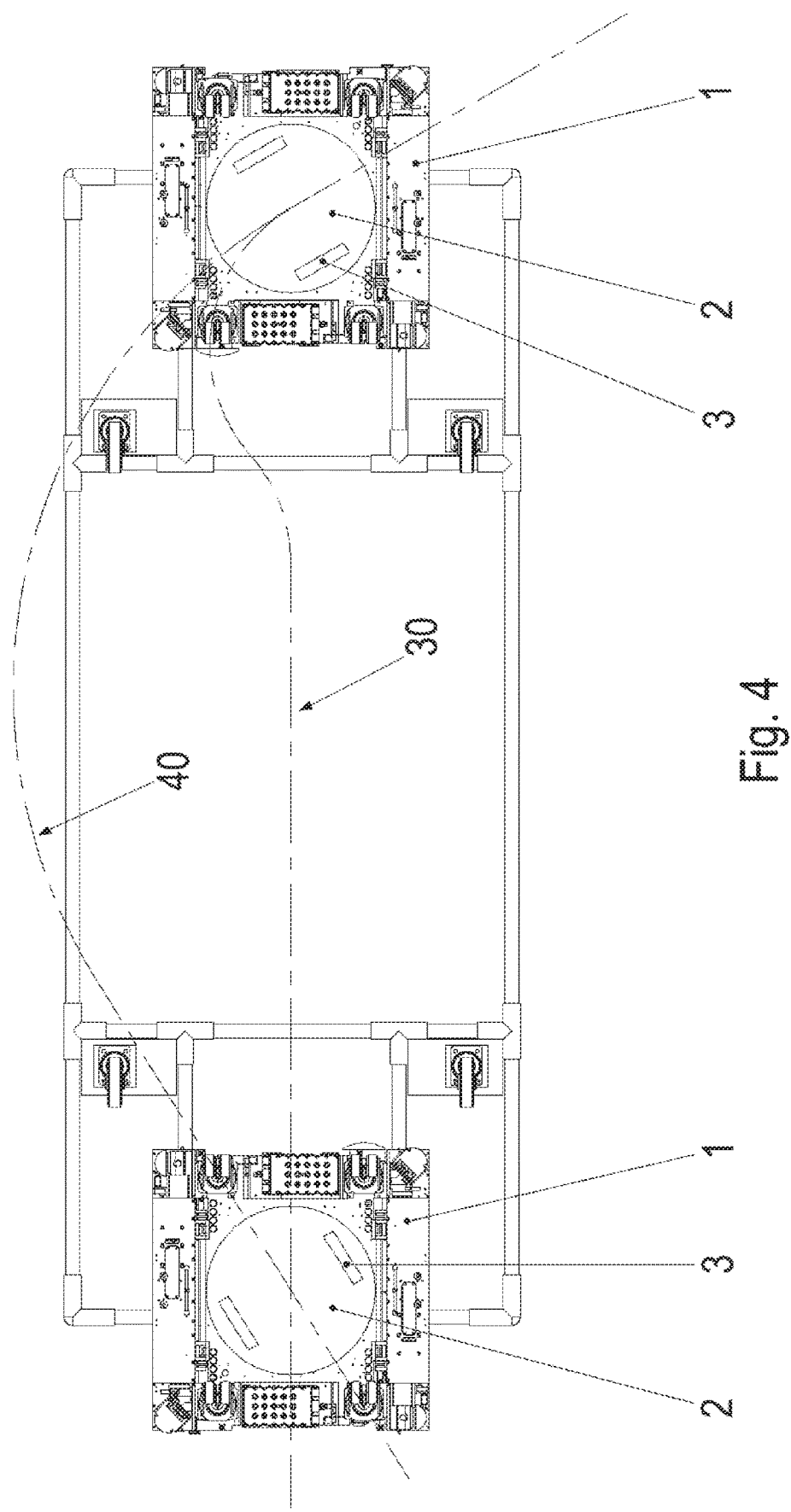
FIG. 4 shows a trajectory 40 along which travel may take place if first mobile component 1 has steerable drive wheels and second mobile component 1 also has steerable drive wheels.

As illustrated in the Figures, transport rack 4 may have four casters, each having a roller 5 which is rotatably mounted in a roller bearing unit 6, the roller bearing unit being mounted so as to be rotatable about a vertically directed axis of rotation. Roller 5 is mounted so as to be rotatable about a horizontally directed axis of rotation that is always aligned perpendicular to the vertically directed axis of rotation of the roller bearing unit.

In the absence of mobile components 1, transport rack 4 is therefore movable on a floor, i.e. especially a driving surface.

To pick up transport rack 4, two mobile components 1 drive underneath it, the steering rollers being disposed between mobile components 1. Lifting axles 20, which are arranged as a linear drive on mobile components 1 in each case, are then extended and transport rack 4 is raised in this manner. The steering rollers therefore lose contact with the floor, i.e. contact with the driving surface.

Following this pickup of transport rack 4, the two mobile components 1 are operated in a master-slave control, i.e. in a mutual dependency. In other words, mobile component 1 acting as the master is moved along a trajectory 30 or 40, and a setpoint position for mobile component 1 acting as the slave is determined from the respective instantaneous actual position of mobile component 1 acting as a master, the setpoint position being transmitted to mobile component 1 acting as a slave, whose drive then controls or regulates this mobile component 1 acting as the slave to the setpoint position.

Wheels 3 of mobile component 1 driven by an electric motor are disposed on a shaft whose axle is horizontally aligned. Two wheels 3 in each case are aligned parallel to each other. Wheels 3 or their shafts are driven by an electric motor, thereby making it possible to adjust different rotational speeds of the two wheels 3, which are aligned parallel to each other and have the same size, so that a steering motion is able to be induced. When the rotational frequency of the two wheels 3 is identical, a straight trajectory is traveled whose direction is aligned horizontally and perpendicular to the axis of the shaft.

Wheels 3 or their shafts are rotatably mounted on a unit, which is referred to as turntable 2 and is rotatably mounted on the rack of mobile component 1. Turntable 2 thus determines the steering angle. Turntable 2 is pressed against the driving surface only by a defined force via wheels 3. The weight force, which depends on the picked up transport goods or the transport rack, is shunted to the driving surface via steering rollers 8, which are disposed on the rack of the mobile component for this purpose. Steering rollers 8 thus shunt the substantial portion of the weight force of mobile component 1 and the load it has picked up into the driving surface.

Mobile components 1 have sensors 8, which detect obstacles and/or objects so that mobile component 1 is able to be decelerated in time. Sensors 8 are laterally disposed on mobile components 1 such that, with a picked-up transport rack 4 and an execution of the joint driving operated in a master-slave control, front mobile component 1 monitors the half space in front and rear mobile component 1 monitors the rear half space. In addition, the interspace between mobile components 1 underneath transport rack 4 is also able to be monitored with the aid of the respective other sensor 7.

It is important in this context that a communications channel is established between mobile component 1 acting as the slave and mobile component 1 acting as the master. Not only is the information required for the master-slave control transmitted via this communications channel but also the signals from sensor 8 of mobile component 1 acting as the slave. The signals from all sensors 8 of both mobile components 1 are therefore able to be evaluated in the electrical control of mobile component 1 acting as the master, and warning information is able to be indicated as a function thereof and/or is able to be forwarded, and/or an action such as the braking of mobile components 1 or controlling of mobile components 1 to a safer velocity is/are able to be carried out.

The communications channel may be provided by the transmission of modulated light. Light transmitters and corresponding receivers that are sensitive to light are laterally disposed on each mobile component for this purpose and are connected to the respective control of respective mobile component 1. Since the communications channel is situated underneath transport rack 4, in the interspace formed between mobile components 1, this communications channel is protected from precipitation, for instance. More specifically, interference light arriving from above is also at least reduced.

At a steering angle of 0°, straight-ahead driving is possible, and at a steering angle of 90°, transverse driving is possible.

As described above, after initially driving underneath transport rack 4, the lifting axles are vertically extended, especially in the upward direction, and transport rack 4 is raised.

This movement of the lifting axles likewise takes place in a master-slave control. To do so, mobile component 1 acting as the master transmits the detected actual values of the vertical position its lifting axle 20 via the communications channel to mobile component 1 acting as the slave, uses them as the respective instantaneous setpoint value, or determines a respective instantaneous setpoint value therefrom. The vertical position of lifting axle 20 of mobile component 1 acting as a slave is controlled to the respective instantaneous setpoint value. The updating may take place at time intervals of less than 20 milliseconds.

In other words, the information of the master-slave controls used for the actuation of the lifting axles and for the driving are transmitted via the same communications channel. Thus, at least the information required for the master-slave controls is acting upon the modulated light transmitted underneath transport rack 4 between mobile components 1, or in other words, this information is modulated onto the light. It is even possible to temporarily extend the lifting axles even when the underdriving is not yet fully complete. As a result, the travel-drive control may be operated simultaneously with the lifting-axle control.

During the joint driving, mobile components 1 are operated in a master-slave control. In the process, wheels 3 of the first mobile component, which are disposed on turntable 2, are operated in a different manner, such that a steering angle comes about, i.e. turntable 2 is rotated relative to the rest of mobile component 1. Wheels 3 of turntable 2 of other mobile component 1 are operated in an identical manner so that the steering angle is vanishingly small and no rotation of turntable 2 relative to the rest of mobile component 1 consequently takes place.

Thus, a trajectory 30 is able to be driven in joint driving.

However, if a non-vanishing steering angle of second mobile component 1 is permitted as well, i.e. wheels 3 of the second mobile component are driven in a different manner so that turntable 2 rotates relative to the rest of mobile component 1, then it is even possible to manage trajectory 40, where a further excursion of the components of the transport system occurs. Here, more narrow curve radii than are found in trajectory 30, i.e. permitted steering only by first mobile component 1, are, for example, drivable with simultaneous steering of both mobile components 1, i.e. also a rotation of turntables 2.

Mobile component 1 acting as a master and the mobile component acting as a slave may have knowledge of the task of transporting the transport rack and also knowledge of the starting position and the end position. The mobile component acting as the master plans its own trajectory as the setpoint path trajectory for this purpose and informs the mobile component acting as a slave accordingly. The latter calculates its own trajectory taking into account the length of the transport rack and the trajectory transmitted by the mobile component acting as the master. The master informs the mobile component acting as the slave of its intended driving diagram. The driving diagram includes the time characteristics of the velocities provided for driving the trajectory provided for the mobile component acting as the master. Mobile component 1 acting as the slave determines its own driving diagram on that basis.

Each mobile component has its own position-determination system so that each mobile component is able to determine its respective position. Transmitters are placed in the environment for this purpose such that mobile component 1 determines the position in the manner of a GPS system.

Each mobile component also has a transmitting and receiving device for a communications channel to a central control of the plant that encompasses the transport system and the driving surface, the communications channel being based on radio waves. For example, the system is a production facility for the manufacture of goods. Parts required for the manufacture, or the products are able to be transported within the plant with the aid of transport rack 4. The system and method described herein thus aid in the intralogistic transport of the production facility.

During the joint driving, mobile component 1 acting as the slave determines the respective instantaneous distance and the respective instantaneous orientation with respect to mobile component 1 acting as the master with the aid of laser scanners.

The instantaneous torque is determined and monitored during the joint driving. If an excessively high deviation is detected, a warning is indicated or forwarded, and/or stopping of mobile components 1 is induced.

If one of mobile components 1 detects an obstacle, this information is transmitted to other mobile component 1.

The mobile components may be controlled in a different manner. In this case, first mobile component 1 determines a setpoint torque that is required to travel the predefined trajectory according to a predefined driving diagram. The driving diagram includes a time characteristic of the positions and/or a time characteristic of the velocity of first mobile component 1 along the trajectory. The instantaneously required torque is determined according to the driving diagram. A first share, e.g., 50%, of this torque is used as a setpoint value for a torque control of first mobile component 1, and the remaining share, 50% in the example, is used as a setpoint value for a torque control of second mobile component 1. Each mobile component 1 determines the respective actual value of the generated torque for this purpose and then controls it to the respective setpoint value. The torque control may be subordinate to some other control.

Mobile component 1 acting as the master monitors the environment with the aid of its sensors, and a hysteresis is provided. The detected values of the first physical quantities are therefore monitored for an exceeding or an undershooting of a threshold value, for which a hysteresis is taken into account. The sensors of mobile component 1 acting as the master monitor the same quantities, i.e. monitor the detected values of the same quantities for the exceeding or undershooting of the threshold value, for which a smaller hysteresis is taken into account. This ensures that the master intervenes only when the slave is no longer able to follow, for instance on account of a fault.

It may be provided that either the information required for the master-slave control of lifting axles 20 is transmitted via the communications channel or else the information required for the master-slave control of the joint driving of the mobile components.

LIST OF REFERENCE NUMERALS 1 mobile component
2 turntable
3 wheel
4 transport rack
5 roller
6 roller bearing unit
7 sensor
8 steering roller
20 lifting axle
30 first trajectory
40 second trajectory

The invention claimed is:

1. A transport system, comprising:
a first mobile component;
a second mobile component;
a communications channel provided between the first mobile component and the second mobile component;
a transport rack; and
a bearing provided on the transport rack,
wherein each mobile component includes a linear axle, a control device, and wheels that are driven by an electric motor,
wherein the first mobile component is adapted to drive underneath the transport rack in a first region of the transport rack, and the second mobile component is adapted to drive underneath the transport rack in a second region of the transport rack;
wherein the transport rack is adapted to be raised by extending the linear axles of the mobile components and/or such that the bearing of the transport rack loses physical contact with the driving surface;
wherein the communications channel is arranged as a transmission channel for data of at least one master-slave control, the first mobile component adapted to act as a master mobile component and the second mobile component adapted to act as a slave mobile component;
wherein the master mobile component is adapted to determine an instantaneously required torque;
wherein the master mobile component is adapted to use a first portion of the torque as a first setpoint value for a torque control located in the master mobile component, so that torque generated by the drive of the master mobile component acting is controlled to the first setpoint value; and
wherein the slave mobile component is adapted to use a remaining portion of the torque as a second setpoint value for a torque control located in the slave mobile component, so that torque generated by the drive of the slave mobile component is controlled to the second setpoint value.

2. The transport system according to claim 1, wherein the first mobile component is adapted to monitor a distance to the second mobile component and/or the second mobile component is adapted to monitor a distance to the first mobile component.

3. The transport system according to claim 1, wherein the communications channel is adapted to modulate light, infrared light, and/or visible light and/or arranged between the transport rack and the driving surface.

4. The transport system according to claim 1, wherein a travel drive of the mobile component acting as the slave is controlled and/or operated with the aid of a master-slave control as a function of instantaneously determined values of a physical quantity of a travel drive of the mobile component acting as the master, such that a distance between the two mobile components is constant and/or the transport rack is disposed on the mobile components in a relatively immobile manner.

5. The transport system according to claim 1, wherein the linear axle of the mobile component acting as the slave is controlled and/or operated with the aid of a master-slave control as a function of instantaneously determined values of a physical quantity of the linear axle of the mobile component acting as the master, such that the transport rack is evenly raised by the two linear axles.

6. The transport system according to claim 1, wherein the communications channel is adapted to act as a transmission channel for data of a first and a second master-slave control, the first mobile component acting as a master and the second mobile component acting as a slave, the two controls adapted to operate in a manner that overlaps in time, the first master-slave control adapted to control and/or operate the travel drive of the mobile component acting as the slave as a function of instantaneously determined values of a physical quantity of the travel drive of the mobile component acting as the master, such that a distance between the two mobile components is constant and/or the transport rack is disposed on the mobile components in a relatively immobile manner, the second master-slave control adapted to control and/or operate the linear axle, provided for raising the transport rack, of the mobile component acting as the slave as a function of respective instantaneously determined values of a physical quantity of the linear axle, provided for raising the transport rack, of the mobile component acting as the master, such a way that the transport rack is evenly raised by the two linear axles.

7. The transport system according to claim 1, wherein the wheels of at least one of the mobile components are steerable and/or a wheel fixture unit and/or a turntable disposed on a respective mobile component is rotatably mounted on a rack of the mobile component, an axis of rotation arranged parallel to a normal direction of the driving surface at a contact point of the wheels with the driving surface.

8. The transport system according to claim 1, wherein the communications channel is arranged between the mobile components and underneath the transport rack and/or between the driving surface and the transport rack.

9. A method for operating a transport system that includes:
a first mobile component;
a second mobile component;
a communications channel provided between the first mobile component and the second mobile component;
a transport rack; and
a bearing provided on the transport rack,
wherein each mobile component includes a linear axle, a control device, and wheels that are driven by an electric motor,
wherein the first mobile component is adapted to drive underneath the transport rack in a first region of the transport rack, and the second mobile component is adapted to drive underneath the transport rack in a second region of the transport rack;
wherein the transport rack is adapted to be raised by extending the linear axles of the mobile components and/or such that the bearing of the transport rack loses physical contact with the driving surface; and
wherein the communications channel is arranged as a transmission channel for data of at least one master-slave control, the first mobile component adapted to act as a master and the second mobile component adapted to act as a slave;
the method comprising:
detecting a position in a first one of the mobile components;
transmitting the position to a second of the mobile components;
determining an instantaneously required torque in the master mobile component;
using a first portion of the torque as a first setpoint value for a torque control located in the master mobile component, so that torque generated by the drive of the master mobile component acting is controlled to the first setpoint value; and
using a remaining portion of the torque as a second setpoint value for a torque control located in the slave mobile component, so that torque generated by the drive of the slave mobile component is controlled to the second setpoint value.

10. A method for operating a transport system that includes:
a first mobile component;
a second mobile component;
a communications channel provided between the first mobile component and the second mobile component;
a transport rack; and
a bearing provided on the transport rack,
wherein each mobile component includes a linear axle, a control device, and wheels that are driven by an electric motor,
wherein the first mobile component is adapted to drive underneath the transport rack in a first region of the transport rack, and the second mobile component is adapted to drive underneath the transport rack in a second region of the transport rack;
wherein the transport rack is adapted to be raised by extending the linear axles of the mobile components and/or such that the bearing of the transport rack loses physical contact with the driving surface; and
wherein the communications channel is arranged as a transmission channel for data of at least one master-slave control, the first mobile component adapted to act as a master and the second mobile component adapted to act as a slave;
the method comprising:
detecting a position in a first one of the mobile components; and
transmitting the position to a second of the mobile components;
wherein one of the mobile components acts as a master mobile component and the other mobile component acts as a slave mobile component, the master mobile component informs the slave mobile component of a driving diagram of the master mobile component and/or transmits the driving diagram of the master mobile component to the slave mobile component via the communications channel, the slave mobile component determining a driving diagram of the slave mobile component from the driving diagram of the master mobile component, at least one of the driving diagrams including a time characteristic of velocities determined for traveling a trajectory.

11. The method according to claim 10, further comprising:
determining, in the master mobile component, a respective instantaneously required torque of a drive as a function of a transportation load and an inclination of the driving surface;
using a first portion of the torque as a first setpoint value for a torque control located in the master mobile component, so that torque generated by the drive of the master mobile component is controlled to the first setpoint value; and using a remaining portion of the torque as a second setpoint value for a torque control located in the slave mobile component, so that torque generated by the drive of the slave mobile component acting is controlled to the second setpoint value.

12. A method for operating a transport system that includes:
- a first mobile component;
- a second mobile component;
- a communications channel provided between the first mobile component and the second mobile component;
- a transport rack; and
- a bearing provided on the transport rack,
- wherein each mobile component includes a linear axle, a control device, and wheels that are driven by an electric motor,
- wherein the first mobile component is adapted to drive underneath the transport rack in a first region of the transport rack, and the second mobile component is adapted to drive underneath the transport rack in a second region of the transport rack;
- wherein the transport rack is adapted to be raised by extending the linear axles of the mobile components and/or such that the bearing of the transport rack loses physical contact with the driving surface;
- wherein the communications channel is arranged as a transmission channel for data of at least one master-slave control, the first mobile component adapted to act as a master and the second mobile component adapted to act as a slave; and
- wherein one of the mobile components is arranged as a master mobile component, the other mobile component arranged as a slave mobile component;

the method comprising:

determining an instantaneously required torque in the master mobile component;

using a first portion of the torque as a first setpoint value for a torque control located in the master mobile component, so that torque generated by the drive of the master mobile component acting is controlled to the first setpoint value; and using a remaining portion of the torque as a second setpoint value for a torque control located in the slave mobile component, so that torque generated by the drive of the slave mobile component is controlled to the second setpoint value.

* * * * *